United States Patent [19]
Mattis et al.

[11] Patent Number: 5,403,996
[45] Date of Patent: Apr. 4, 1995

[54] CONNECTOR RECEPTACLE CONSTRUCTION FOR ELECTRIC CIGAR LIGHTERS

[75] Inventors: Donald J. Mattis, Norwalk; Ali El-Haj, Trumbull, both of Conn.

[73] Assignee: Casco Products Corporation, Bridgeport, Conn.

[21] Appl. No.: 201,700

[22] Filed: Feb. 25, 1994

[51] Int. Cl.6 .................... F23Q 7/00; F23Q 13/00
[52] U.S. Cl. .................................. 219/265; 219/267
[58] Field of Search ..................... 219/260–270, 219/541; 439/668

[56] References Cited

U.S. PATENT DOCUMENTS

| | | | |
|---|---|---|---|
| Re. 26,316 | 12/1967 | Horwitt | 219/265 |
| 2,224,034 | 12/1940 | Lehmann | |
| 2,248,402 | 7/1941 | Conboy | |
| 2,256,876 | 9/1941 | Wolfson | |
| 2,258,989 | 10/1941 | Liner | 201/48 |
| 2,262,484 | 11/1941 | Bahr | |
| 3,012,120 | 12/1961 | Gaudet | 219/265 |
| 3,424,414 | 1/1969 | Horwitt | 248/27 |
| 3,462,721 | 8/1969 | Boudreau | 219/265 |
| 3,532,849 | 10/1970 | Horwitt | 219/265 |
| 3,644,867 | 2/1972 | Krause | 439/668 |
| 3,818,179 | 6/1974 | Mase | 219/267 |
| 3,863,047 | 1/1975 | Mase | 219/265 |
| 3,870,857 | 3/1975 | Horwitt et al. | 219/267 |
| 3,892,944 | 7/1975 | Horwitt et al. | 219/270 |
| 3,904,848 | 9/1975 | Horwitt et al. | 219/267 |
| 4,387,292 | 6/1983 | Vitaloni | 219/267 |
| 4,431,904 | 2/1984 | Suzuki | 219/265 |
| 4,498,726 | 2/1985 | Mattis | 339/182 R |
| 4,544,226 | 10/1985 | Lupoli et al. | 219/267 |
| 4,580,856 | 4/1986 | Westover et al. | 339/10 |
| 4,650,962 | 3/1987 | Pramaggiore | 219/264 |
| 4,669,185 | 6/1987 | Westover et al. | 29/882 |
| 4,713,017 | 12/1987 | Pesapane | 439/132 |
| 4,713,733 | 12/1987 | Fitz et al. | 362/80 |
| 5,044,993 | 9/1991 | El-Haj et al. | 439/668 |
| 5,116,233 | 5/1992 | Croce | 439/161 |

Primary Examiner—John A. Jeffery
Attorney, Agent, or Firm—Mitchell D. Bittman; H. Gibner Lehmann

[57] ABSTRACT

A cigar lighter receptacle construction includes a well part and a separate safety connector cartridge part adapted to be disconnectably carried at the rear of the well part. The parts have electrical connector structures forming engageable pairs of contactors. At least one pair of contactors is in the form of telescopic cup-like formations. There is further provided a bimetallic finger carried by the cartridge part, adapted to shunt the connector structures of the cartridge part in response to overheating of the well part. The arrangement is such that both the well part and the cartridge part are relatively simple sub-assemblies which can be manufactured at greatly reduced expense by virtue of the various assembly steps being carried out largely by automated equipment.

30 Claims, 3 Drawing Sheets

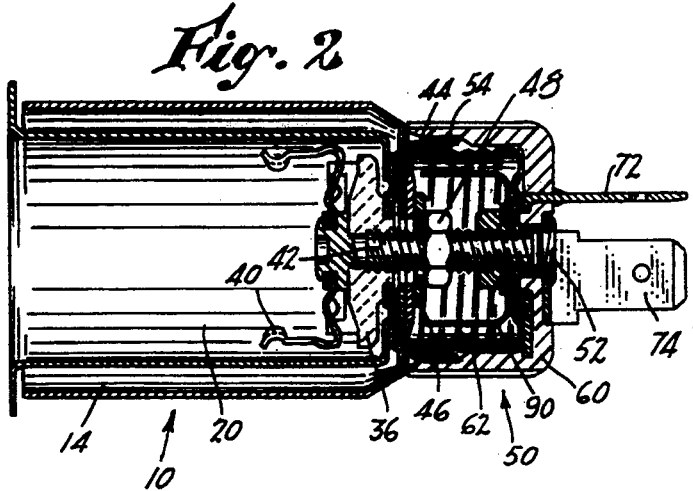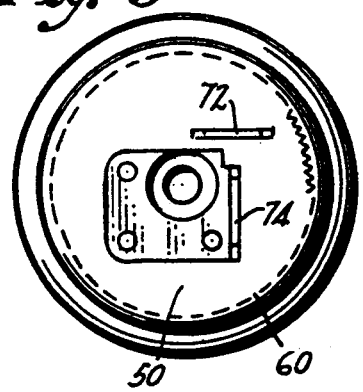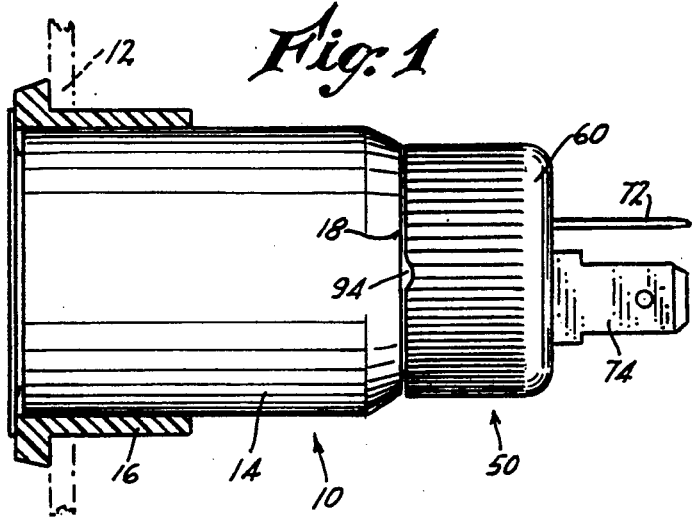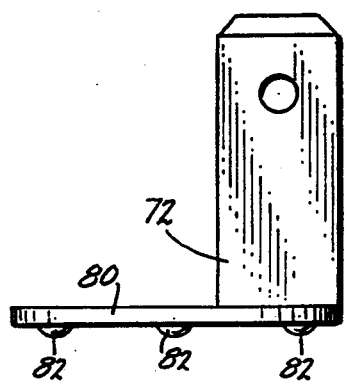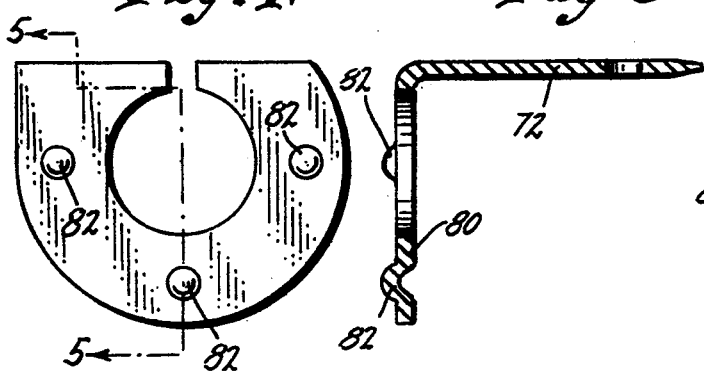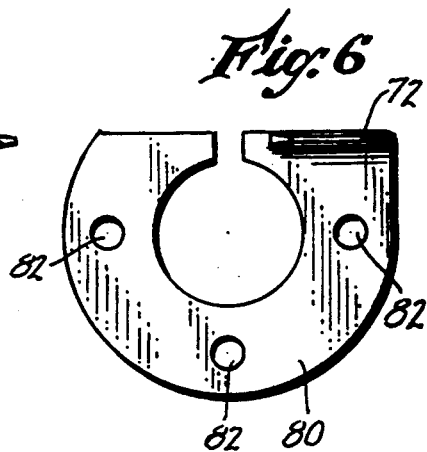

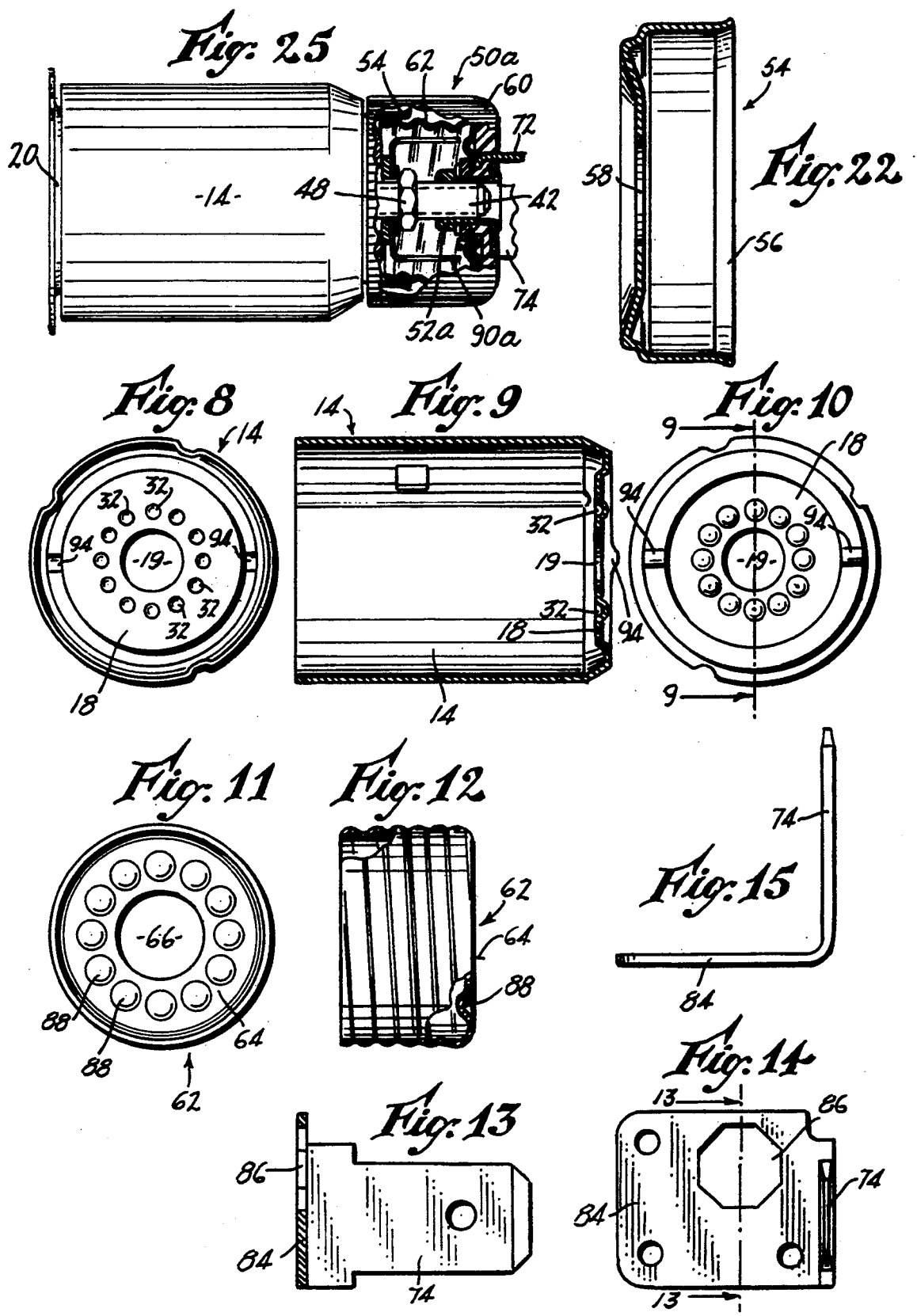

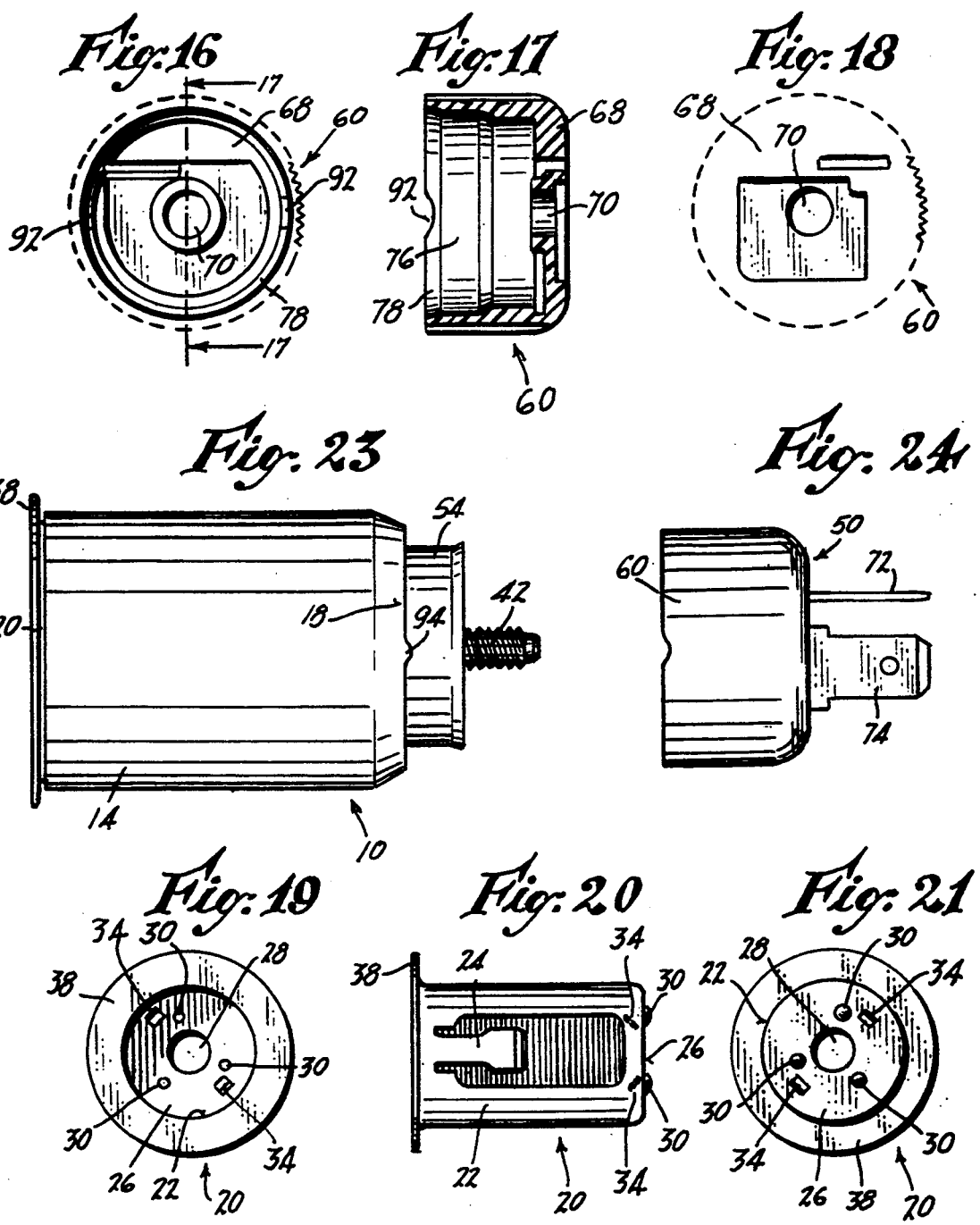

CONNECTOR RECEPTACLE CONSTRUCTION FOR ELECTRIC CIGAR LIGHTERS

BACKGROUND OF THE INVENTION

1. Field of the Invention

This invention relates generally to electric cigar lighters of the type commonly employed in automotive or recreation vehicles, and more particularly to specialized electrical connector constructions for energizing such lighters.

2. Description of the Related Art Including Information Disclosed Under 37 CFR 1.97-1.99

The present invention relates more particularly to improvements in the cigar lighter receptacle construction illustrated and described in assignee's expired U.S. Pat. No. 3,532,849 dated Oct. 6, 1970, issued to L. Horwitt, and entitled BIMETAL SHUNT FOR ELECTRIC CIGAR LIGHTER. Reference is specifically made to the embodiment of FIG. 4, and that of FIG. 5 of this patent. The following additional patents are hereby made of record and are believed to constitute a sampling of existing prior art in the field to which the invention relates:

U.S. Pat. Nos.:

| U.S. Pat. Nos.: | | |
| --- | --- | --- |
| 2,224,034 | 2,248,402 | 2,256,876 |
| 2,258,989 | 2,262,484 | 3,012,120 |
| 3,424,414 | 3,462,721 | 3,818,179 |
| 3,863,047 | 3,870,857 | 3,892,944 |
| 3,904,848 | 4,498,726 | 4,580,856 |
| 4,650,962 | 4,669,185 | 4,713,017 |
| 4,713,733 | 5,044,993 | 5,116,233 |

U.S. Pat. No. 3,532,849, FIGS. 4 and 5, discloses cigar lighter constructions incorporating bimetal shunts disposed in adapter shells (22, 22') mounted at the rear of a lighter socket. In such constructions, controlled flexing of the bimetal occurs unless an overheat condition arises in the socket, such as that resulting from a short circuit in either the socket or the removable ignitor unit. In the event of malfunction, the bimetal flexes sufficiently to electrically contact the inner surface of the shell, thereby shorting the hot lead to ground, and purposely blowing an in-line fuse so as to minimize the possibility of a fire.

The concept of the bimetal shunt circuit in a cigar lighter socket has been widely accepted since the advent of this patent, and devices embodying the basic concept thereof have, as a result, enjoyed great commercial success over the years, having been utilized in millions of automotive vehicles and spanning a period of more than two decades.

Particular reference is made to the following three patents:

1. U.S. Pat. No. 3,012,120 discloses an in-line bimetal circuit breaker for installation at the rear of a cigar lighter socket. As shown, only the "hot" electrical circuit is controlled; the ground side of the circuit remains intact after the breaker opens. As opposed to Patent No. '849 discussed above, this patented construction did not "shunt" the hot side of the circuit during an overheat condition. Instead, it effectively "interrupted" the circuit, as in the case of a fuse or circuit breaker, and once such an interruption occurred, the device was intended to be removed and discarded, and a substitute unit installed. The device was intended to fit existing cigar lighter base constructions, as stated in col. 3, line 25 of the patent.

2. U.S. Pat. No. 4,498,726 illustrates and describes a connector for a cigar lighter socket of the kind having a bimetal safety shunt similar to that of Patent No. '849 identified above. The current carrying leads for both the hot and ground sides of the cigar lighter circuit are embedded in a molded plastic or rubber plug, and the plug is adapted to be pushed onto the central terminal stud of the base, and in addition, to make electrical contact with a screw shell carried by the base. In this construction, the bimetal shunt is a part of the cigar lighter socket per se.

3. U.S. Pat. No. 3,462,721 illustrates and describes a circuit breaker for a cigar lighter, in the form of a capsule-like enclosure disposed at the rear of the lighter socket, and containing a bimetallic circuit-breaker type element. The breaker element is adapted to open the hot side of the circuit in the event of overheating of the socket or plug as a consequence of malfunction. Provision is made for insertion of an elongate rod through the socket from the front, to access the interior of the enclosure and enable the breaker mechanism to be re-set, following actuation.

Referring now to others of the patents listed above, three show another form of cigar lighter which has been in widespread use in this country, for at least 15 years. In particular, U.S. Pat. Nos. 3,870,857; 3,892,944; and 3,904,848 contain generally similar disclosures which describe cigar lighter structures that are especially adapted for manufacture and assembly by means of automated equipment. At that time, the lighters represented by these three patents were referred to by the assignee corporation, as "New Generation Lighters" because of the advances that had been made with respect to economy, ease of assembly, low failure rate, and the ability to mass produce them in large quantities.

U.S. Pat. No. 5,116,233 discloses a cigar lighter construction utilizing a modified form of bimetal shunt, somewhat similar to that of Patent No. '849 noted above. In this patented design, the bimetal shunt is disposed inside the lighter socket, and is indicated at (17). Overheating of the pull-out igniting unit (not shown), or of the socket itself results in the bimetal contacting the inner surface of the metal socket wall (18), in turn causing an in-line fuse (not shown) to blow and thus minimize potential fire hazard.

The remaining patents mostly deal either with bimetal circuit controllers, or else with various terminal configurations associated with known cigar lighters and which were designed to facilitate making electrical connection thereto. These are briefly discussed hereinbelow, in chronological order.

U.S. Pat. No. 2,224,034 shows an early lighter design employing a bimetal element that is utilized solely as a releasable, non-current carrying clip which is engaged by a heating element cup when the lighter is actuated. One side of the electrical circuit was established through the metal socket of the lighter, while the hot side (stud 28, FIG. 1) accepted a crimp-type lug connected to an electrical lead of the wiring harness (not shown) of the vehicle's electrical system.

U.S. Pat. No. 2,248,402 illustrates another type of lighter construction in which a bimetal carried in the socket of the device is employed to release a latch that holds the ignitor plug as it is being energized. As in the patent of the previous paragraph, the bimetal itself is electrically out of the circuit, and merely functions to sense that a predetermined heat level has been attained by the heating element of the ignitor plug.

U.S. Pat. No. 2,256,876 illustrates a cigar lighter construction employing two bimetals, one to control latching and release of a spring-biased ignitor plug, and a second bimetal which, in the embodiment of FIG. 1, presses against the first with variable pressure depending upon the ambient temperature prevailing at any particular time. The objective is to minimize undesirable fluctuations in the operation of the first bimetal latch which would otherwise result from changes in its "starting" position due to ambient temperature variations. This patent was cited against U.S. Pat. No. 3,863,047, discussed below.

U.S. Pat. No. 2,258,989 illustrates a temperature sensor plug of especially compact design and which incorporates a bimetal member having multiple reverse bends to the end that changes in temperature cause deflection of the various branches of the bimetal in a manner wherein they are cumulative, in order to obtain maximum deflection and sensitivity over the range of temperatures being monitored. This patent was cited against U.S. Pat. No. 5,116,233 discussed above and which related directly to a bimetal shunt for a cigar lighter.

U.S. Pat. No. 2,262,484 illustrates an automatic cigar lighter having a disk-like bimetallic element which is disposed exteriorly of the socket of the lighter, and which is mechanically flexed by insertion of the ignitor plug, to close external switch contacts. Upon experiencing heat from the heating coil of the ignitor plug, the bimetallic element reverses its curvature and opens the contacts. The bimetallic element itself is separate from the current carrying part of the circuit, and as a result carries no current per se.

U.S. Pat. No. 3,424,414 illustrates a known cigar lighter receptacle of a type which employed the usual bimetallic latching fingers for engagement with a heating element cup of an ignitor plug. This patent was cited against Patent No. '849 noted above.

U.S. Pat. No. 3,818,179 discloses a cigar lighter of a type having conventional internal bimetallic fingers which engage a heating element cup of an ignitor plug, and the socket of which has a rearwardly extending, generally cylindrical terminal post (27) for connection to a source of power, not shown. The receptacle configuration adapted to mate with this post is similarly not shown.

U.S. Pat. No. 3,863,047 describes a cigar lighter having incorporated therein a bimetal shunt adapted to respond to overheating within the socket by shifting against a plate connected to the hot terminal, to blow a fuse and minimize potential fire hazard. In one embodiment, the bimetal is carried by the ground side of the cigar lighter circuit, and is arranged to bridge the hot side of the circuit upon experiencing overheating. In a second embodiment, the bimetal is carried by the hot terminal, and is arranged to contact the inner surface of the cigar lighter socket upon experiencing overheating therein.

U.S. Pat. No. 4,580,856 discloses a composite clamp shell for a cigar lighter, constituted of two pieces and including an integral spade lug type terminal for connection to the ground side of an electric circuit, as by means of a grounding push-on type receptacle. U.S. Pat. No. 4,669,185 contains a similar disclosure, having been a Divisional Application based on the Application which matured into U.S. Pat. No. 4,580,856.

U.S. Pat. No. 4,713,017 illustrates and describes an electrical power outlet having a configuration somewhat similar to that of an electric cigar lighter socket. The rear of the socket contains two flat electrical terminals for connection to an electrical circuit.

U.S. Pat. No. 4,713,733 discloses a cigar lighter having a socket with two rearwardly-extending spade lugs for connection to an electrical receptacle (not shown).

U.S. Pat. No. 5,044,993 illustrates a power outlet construction comprising a socket formation having rearwardly extending contacts in the form of flat terminals, one of which is integral with the socket formation of the cigar lighter, having been stamped out therefrom. The resulting end portion of the one terminal is folded back upon itself, to form a contact terminal comprising a double thickness of metal, for improved strength.

While the devices disclosed in the patents noted above have in some circumstances met with commercial success, there is a continuous need to reduce overall manufacturing costs, including steps toward either minimizing or eliminating manual labor. In many of the patented structures, this objective of cost has not been adequately addressed.

Currently there exists a pronounced trend toward use of plastics in the automotive field, especially in the passenger compartment; accordingly, special attention must be given to potential sources of heat and/or fire. In some of the patented cigar lighter constructions employing a bimetal shunt, the bimetal was exposed at the rear of the socket. Where overheating occurred, resulting in actuation of the bimetal shunt, arcing at the point of contact between the bimetal and its surrounding grounded conductor was considered somewhat of an electrical hazard.

Also, most prior lighter designs utilized specially configured connectors for energizing the cigar lighter through the socket. Until recently, relatively little attention was given toward standardization of the socket structures and their terminals, and as a consequence, a multiplicity of divergent socket designs have been devised and utilized over the years.

SUMMARY OF THE INVENTION

The above disadvantages and drawbacks of prior cigar lighter receptacles are largely obviated by the present invention which has for one object to provide a novel and improved cigar lighter receptacle which is especially simple in all of its structure, as well as being rugged and reliable in use.

Still another object of the invention is to provide an improved cigar lighter receptacle as outlined above, wherein the unit can be largely fabricated by automated assembly equipment, thereby reducing the overall manufacturing expense to the greatest possible extent.

Yet another object of the invention is to provide an improved cigar lighter receptacle of the kind indicated, incorporating a safety bimetal shunt which is especially safe in use, due to its being essentially completely concealed in the lighter receptacle, such that any arcing which may occur during operation of the shunt is safely confined, and therefore does not extend into the area outside of the receptacle per se.

Still another object of the invention is to provide an improved cigar lighter receptacle as above characterized, which utilizes simple electrical terminal connections that are directly compatible with existing cooperable connectors of a type which have become standard in the automotive industry.

Yet another object of the invention is to provide an improved cigar lighter receptacle as above set forth, which is easily installed, and which is characterized by high contact integrity, thereby largely eliminating potential problems of inadvertent contact heating resulting from poor electrical connections arising between the various parts.

In accomplishing the above objects the invention provides a cigar lighter receptacle construction, comprising in combination a heat-shielded well part and a separate safety thermal protecting connector cartridge part adapted to be disconnectably carried at the rear of the well part, the parts having electrical connector means forming engageable pairs of contactors. At least one pair of contactors comprises telescopic cup-like formations. There are further provided bimetallic means carried by the safety cartridge part, adapted to shunt the connector means of the cartridge part in response to overheating of the well part. The arrangement is such that both the well part and the cartridge part are constituted as relatively simple sub-assemblies which can be manufactured at greatly reduced expense by virtue of the various assembly steps being carried out by automated equipment. The disclosed constructions, in spite of being inexpensive to manufacture, have been shown to be reliable in use, even after extensive life testing has been performed.

The invention further provides an improved cigar lighter receptacle construction, comprising in combination a heat-shielded well part and a separate safety thermal connector cartridge part adapted to be carried at the rear of the well part. The parts have electrical connector means forming engageable pairs of contactors, and at least one pair of contactors comprises telescopic cup-like formations. Bimetallic means are in this case carried by the well part, being adapted to shunt the connector means of the cartridge part in response to overheating of the well part.

The invention still further provides a heat-protected cigar lighter receptacle construction having improved circuit integrity, comprising in combination a well part and a separate connector cartridge part adapted to be disconnectably carried at the rear of the well part. The parts have electrical connector means forming engageable pairs of contactors. At least one of the pairs of contactors comprises self-centering frictionally interengaging, electrically contacting cup-shaped contact formations carried respectively by the well part and the connector cartridge part.

The invention also provides a cigar lighter receptacle construction, comprising in combination a well part and a separate connector cartridge part adapted to be disconnectably carried at the rear of the well part. The well part has two electrical terminal portions electrically insulated from one another and connected respectively with two electrical circuits of the well part. The separate connector cartridge part has two projecting electrical terminals, electrically insulated from one another, and extending outwardly from the body of the cartridge part. There are provided means electrically connecting the projecting electrical terminals of the separate connector cartridge part respectively to the two electrical terminal portions of the well part, thereby to enable the cigar lighter receptacle construction to be energized through the projecting electrical terminals of the cartridge part by an electrical connector receptacle connected directly to the projecting electrical terminals thereof. The projecting electrical terminals of the cartridge part comprise two spade lug terminals respectively.

With the disclosed constructions, there is realized a safety connector cartridge part which is initially separate from a cigar lighter well part such that the manufacture of the two parts can be greatly simplified by means of automated assembly equipment. In spite of the ease of assembly, there is still retained the reliability and functionality of the cigar lighter and receptacle, the two being essentially unitary in their final configuration, and capable for use directly with an electrical wiring harness connector receptacle of conventional construction and of a type which has become standard in the automotive industry today.

Other features and advantages will hereinafter appear.

BRIEF DESCRIPTION OF THE DRAWINGS

FIG. 1 is a side elevational view of the improved connector receptacle construction for cigar lighters, as provided by the invention.

FIG. 2 is an axial sectional view of the construction of FIG. 1.

FIG. 3 is a back end elevational view of the construction of FIGS. 1 and 2.

FIG. 4 is a front plan view of one of the spade lug parts of the connector construction.

FIG. 5 is a sectional view, taken on the line 5—5 of FIG. 4.

FIG. 6 is a rear plan view of the spade lug part of FIGS. 4 and 5.

FIG. 7 is a side elevational view of the spade lug part of FIGS. 4-6.

FIG. 8 is a front elevational view of the heat shield part of the connector receptacle construction.

FIG. 9 is an axial sectional view of the heat shield part shown in FIG. 8, taken on the line 9—9 of FIG. 10.

FIG. 10 is a rear elevational view of the heat shield part of FIGS. 8 and 9.

FIG. 11 is a front elevational view of a contact cup of the connector receptacle construction.

FIG. 12 is a view partly in side elevation and partly in section, of the contact cup of FIG. 11.

FIG. 13 is a side elevational view of another of the spade lug parts of the connector receptacle construction.

FIG. 14 is a rear elevational view of the spade lug part of FIG. 13.

FIG. 15 is top plan view of the spade lug part of FIGS. 13 and 14.

FIG. 16 is a front elevational view of the insulating or thermal cup part of the connector receptacle construction.

FIG. 17 is a vertical section of the thermal cup part, taken on the line 17—17 of FIG. 16.

FIG. 18 is a rear elevational view of the thermal cup part of FIGS. 16 and 17.

FIG. 19 is a front elevational view of the socket member part of the connector receptacle construction.

FIG. 20 is a side elevational view of the socket member part of FIG. 19.

FIG. 21 is a rear elevational view of the socket member part of FIGS. 19 and 20.

FIG. 22 is an axial sectional view of a contact cup part of the connector receptacle construction.

FIG. 23 is a side elevational view of the assembled receptacle or well part of the connector construction.

FIG. 24 is a side elevational view of the assembled safety cartage part of the connector construction, and FIG. 25 is a view partly in side elevation and partly in axial section, of a modification of the invention wherein the safety bimetallic shunt is carried by the socket member part of the connector construction.

DESCRIPTION OF THE PREFERRED EMBODIMENTS

Referring first to FIGS. 1 and 2, there is illustrated a cigar lighter receptacle construction constituted basically of two cooperable parts, a heat-shielded socket part and a thermal or heat-insulated safety connector cartridge part, said parts being separably connected with each other. The heat-shielded socket or well part is designated generally by the numeral 10, being adapted to be mounted in a supporting panel 12 such as the dashboard of an automotive or recreational vehicle.

The socket part 10 has an outermost heat sleeve or heat shield 14, particularly illustrated in FIGS. 8–10, which is telescopically fitted within a transparent or translucent glow ring 16, FIG. 1, the glow ring 16 being pressed into a mounting hole in the supporting panel 12 and permanently retained therein in a known manner. An electric light (not shown) is normally carried by the heat shield 14, for illuminating the glow ring 16, also in a known manner. The heat shield has a transverse end wall 18 with a central aperture 19.

Disposed inside the heat shield 14 is a tubular socket member 20 constituted as a drawn metal shell, being particularly shown in FIGS. 19–21. The socket member 20 has an annular side wall 22 with lanced spring fingers 24 (two in number, one being shown in FIG. 20) that frictionally engage a cigar lighter ignitor plug (not shown) of a type similar to that of U.S. Pat. No. 3,870,857 above identified, to normally frictionally retain the ignitor plug in a storage position in the socket member 20.

The entire disclosure of U.S. Pat. No. 3,870,857 is specifically incorporated in the present application, by reference.

At its inner end the member 20 has a transverse wall 26, with a central aperture 28 that aligns with the aperture 19 in the heat shield end wall 18. The wall 26 has three circumferentially displaced dimple formations 30 which are intended to be received in three of a plurality of recesses 32 in the heat shield end wall 18, the recesses 32 being twelve in number and being particularly illustrated in FIG. 8. The recesses 32 are formed by stamping, and corresponding nibs appear on the outer surface of the wall 18, as in FIG. 10. In addition, the transverse wall 26 of the member 20 has two lanced tabs 34, FIGS. 19 and 21, which are received in corresponding apertures (not shown) on a ceramic insulating base 36 in the member 20, as described below. The tabs 34 are used for positioning the base 36 in the socket member 20. In the appended claims, the socket member 20 and heat shield 14 are collectively referred to as a well part.

The socket member 20 has a front radially extending flange 38, FIGS. 20 and 23, which is engaged by the glow ring 16 and which positions the socket member 20 with respect thereto and with respect to the dashboard 12. Disposed in the socket member 20 is a U-shaped bimetallic clip 40 adapted to cooperate with the heating element cup (not shown) of a cigar lighter ignitor plug of the type noted in Patent '857 referred to previously.

The bimetallic clip 40 is supported on a threaded contact stud 42 (also called a projecting contact in the claims) which functions as an electrical terminal that is mechanically supported by the well part but is electrically insulated therefrom. The insulating ceramic base 36 that is located in the socket member 20 constitutes an electrically insulating heat-resistant support for the stud 42 and bimetallic clip 40. The base 36 has a tubular boss which extends through the aperture 28 of the transverse end wall 26 of the socket member 20, and also through the aperture 19 of the transverse end wall 18 of the heat shield 14, as shown, the stud 42 in turn extending through the boss of the ceramic base 36. There is a centralizing washer 44 and an insulating washer 46 on the opposite side of the transverse wall 18 of the heat shield 14, as shown, with a nut 48 securing the stud 42, bimetallic clip 40 and base member 36 in position.

During automated assembly of the heat shield 14 and socket member 20, the three nibs 30 of the latter are received in certain recesses 32 of the end wall 18 of the heat shield 14, to achieve an automatic self-centering of the two parts. The nibs 30 ultimately nest in any set of three circumferentially spaced recesses 32 in the heat shield's transverse end wall 18. As noted, the disclosed arrangement is such that the two transverse walls 18, 26 are substantially self-aligning with respect to one another in a radial sense. The assembly of the socket member 20 and heat shield 14 can conveniently be accomplished by means of high-speed automated equipment.

In accordance with the present invention and as shown in FIGS. 1 and 2, there is provided a novel and improved safety connector cartridge or cartridge part 50 adapted for connection to the rear of the well part comprising socket member 20 and heat shield 14, which cartridge part 50 has a threaded bushing 52 constituting a threaded means, and the cartridge part 50 being capable of being screwed on the stud 42 and held thereon so as to establish electrical connection to the "hot" side of the electrical circuit of the cigar lighter well part. This hot side comprises the stud 42 and bimetallic clip 40. In addition, a metal screw shell of the connector cartridge, to be described below, makes intimate electric contact with the electrical "ground" side of the circuit, namely the socket member 20. The bushing 52 and stud 42 constitute part of an electrical connector means forming one pair of cooperable contactors.

In establishing the electrical connections of the separate safety connector cartridge part 50 the well part 14, 20 is, by the invention, provided with a substantially cylindrical grounding cup or cup-like formation 54 shown in FIG. 22, that is mounted on and electrically connected to the transverse wall 18, and is held by the same nut 48 and stud 42 which secure the bimetallic clip 40. The grounding cup 54 has an outwardly flared lip 56, and a central aperture 58 the walls of which are larger than the diameter of the stud, so as to enable the grounding cup 54 to clear the stud 42. The grounding cup 54 mechanically engages and is electrically connected with the transverse wall 18 of the heat shield 14 of the well part.

Also, by the invention the separate safety insulated or thermal part comprising the connector cartridge 50 has a plastic heat-insulating and electrically-insulating cup 60 shown in FIGS. 16–18, having a ribbed outer surface as in FIG. 2, which facilitates grasping the cup, either manually or by means of automated equipment. The connector cartridge 50 comprises a steel screw shell 62, FIGS. 11, 12, having a bottom wall 64 with an aperture 66, the shell 62 being fitted into the plastic cup 60 so as to be in nesting relation therewith. The plastic cup 60 has a transverse bottom wall 68 with an aperture 70. The plastic cup 60 carries two spade lug parts 72, 74 which constitute exterior electrical terminals on the safety connector cartridge part, the spade lug parts being electrically insulated from one another and being respectively shown in FIGS. 4–7 and 13–15. The plastic cup 60 further forms with the screw shell 62 an annular recess 76, FIG. 17, extending between its transverse wall 68 and its lip 78. The recess 76 provides a clearance space for the grounding cup 54, as can be seen in FIG. 2, such that the grounding cup can be sandwiched between the wall of the recess and the threaded screw shell 62.

The screw shell 62 and grounding cup 54 constitute part of an electrical connector means forming a second engageable pair of contactors, which are both cup-like formations, and which telescope one within the other in frictional engagement.

In manufacture of the separate safety connector cartridge 50, the two spade lug parts 72, 74 are preferably molded into the bottom wall 68 of the plastic cup 60 at the time the plastic cup is formed, to provide essentially a three-piece sub-assembly constituted of the plastic cup 60, spade lug part 72 and spade lug part 74. The one spade lug part 72 shown in FIGS. 4–7 has a spade terminal and a base portion 80, constituting an electrical connecting means for the spade terminal. The base portion 80 has a plurality of nibs 82, shown as being three in number, the purpose of which will be explained below.

The second spade lug part 74 shown in FIGS. 13–15, also has a flat terminal and a base portion 84. There is a hole 86 in the base portion 84, preferably of octagonal shape as shown. The base portion 84 constitutes an electrical connecting means for the spade terminal. The spade terminals are substantially perpendicular to one another, and are also substantially coextensive with one another.

The cup-like metal screw shell is illustrated in detail in FIGS. 11 and 12, and is seen to have multiple recesses 88 in its transverse bottom wall 64. These recesses 88 are intended to facilitate seating of the screw shell 62 into the plastic cup 60 after the cup 60 and two spade lug parts 72, 74 have been molded as a sub-assembly. When the screw shell 62 is pressed into the cup 60, the three nibs 82 on spade lug part 72 are received in three of the circumferentially spaced recesses 88 in the transverse wall 64 of the screw shell 62. The arrangement provided is highly effective in establishing a desired self-centering in a radial sense, of the screw shell 62 with respect to the one spade lug part 72; as a result, a high-integrity electrical contact is provided between the spade lug part 72 and metal screw shell 62, which is capable of handling the relatively heavy current associated with cigar lighters of the type intended to be used with the receptacle of the present invention.

Referring again to FIG. 2, and by the present invention there is disposed in the plastic cup a U-shaped bimetal shunt or bimetallic means designated 90, and which is sandwiched between two spacer washers, one of which is conductive and the other of which is insulating. The shunt is preferably finger-like in structure. There is also the threaded bushing 52, constituting a threaded means, having at its inner end an enlarged head, and the opposite end of the bushing 52 is headed over as in FIG. 2. This mechanically secures the bimetallic means 90, the washers, shell 62 and spade lug parts 72, 74 to the plastic cup 60; the bushing 52 is electrically connected to the bimetallic means 90 and spade lug part 74. The bimetallic means 90 is arranged to shunt the bushing 52 and stud 42 to the screw shell 62, which is in the cartridge part, in response to overheating occuring in the well part. In effect, when the bimetallic means 90 engages the screw shell 62, it effects a short circuit thereto, of the stud 42.

Further in accordance with the invention there are provided cooperable detent means or structures on the lip 78 of the plastic cup 60 of the connector cartridge 50, and on the transverse wall 18 of the heat shield 14, for retaining the connector cartridge 50 in position once it has been screwed down to a position wherein its lip 78 engages the heat shield 14. In accomplishing the retention, the lip 78 of the plastic cup 60 is provided with either one or two recesses 92, each having facing stop shoulders. In the case of two recesses 92, they are displaced from one another by 180 degrees for example, and one or two projections 94 on the wall 18 of the heat shield 14 are formed by dimpling. FIGS. 8–10 show two projections 94, each projection having a crest portion and oppositely facing stop shoulder portions. When the connector cartridge 50 becomes seated, the recesses 92 in the plastic cup 60 thereof are located so as to receive the nibs 94 respectively on the heat shield wall 18. The slight mechanical resistance that may be encountered in accomplishing the seating is readily overcome by application of a somewhat increased turning force to the connector cartridge, until the recesses 92 arrive at the nibs 94. The nibs and recesses retain the connector cartridge against inadvertent back off as might occur under conditions of vibration over prolonged periods of time.

As particularly illustrated in FIG. 2, and as noted above, the separate safety connector cartridge 50 is screwed onto the well part comprising the socket member 20 and heat shield 14, in order to effect mechanical retention of the cartridge 50. The edge of the screw shell 62 preferably telescopes inside the grounding cup 54 of the well part, and with suitable dimensioning of the parts, a press fit is established therebetween, resulting in good electrical contact along a multiplicity of points between the two surfaces. In a preferred form, the engaging surfaces of the grounding cup 54 and screw shell 62 can be made generally cylindrical, and include the slight flare 56 which can be in the form of a section of a cone on the outer telescoping part, i.e. the grounding cup 54. As noted, the bushing 52, being threaded, is used to pull up the separate connector cartridge 50 so as to cause forcible engagement between the screw shell 62 and the grounding cup 54, as can be readily understood. As a consequence, a reliable, high-integrity electrical connection is established between the spade lug part 72, through screw shell 62 and to the grounding cup 54 at the rear of the well part. Potential problems with poor or intermittent grounding of the well part through the vehicle wiring harness (not shown) are thus largely avoided. This is especially important where cigar lighters of the type having plug-receiving wells, as in the present instance, are utilized with support panels that are constituted of insulating materials such as plastic. Plastic panels are widely used in modern automotive vehicles in an effort to reduce cost and render the vehicles light in weight, toward the ultimate goal of increasing gasoline mileage.

The spade lug parts 72, 74 are preferably disposed generally perpendicular to one another, and are dimensioned and located to receive a standard push-on electrical receptacle (not shown) of a type commonly used in most automotive wiring harnesses in existence today. Thus, the safety connector cartridge provides not only a convenient, readily assembled integral bimetal shunt circuit within a physically small package, but in addition, also provides an electrical (spade lug) terminal configuration of a type which is directly compatible with existing wiring harness connector receptacles, essentially with no modifications or other type of terminal adapters being required.

This is in contrast with many prior cigar lighter constructions, in which for the "ground" side of the circuit, reliance was placed on the electrical contact between a metal dashboard and a metal clamping shell that carried the lighter socket member. (See U.S. Pat. No. 3,870,857, for example.) Also, various types of "hot" terminal configurations have been employed, as can be seen from the patents noted in the preamble of the present specification. Until recently, standardization was almost nonexistent; by the present invention both the "hot" and the "ground" electrical circuits are established through the connector cartridge 50, with a high degree of contact integrity, and utilizing wiring-harness connector receptacles of a type which have become standard in the automotive industry.

Reduced manufacturing and assembly cost, as well as improved reliability are thus realizeable.

Another embodiment of the invention is illustrated in FIG. 25, wherein corresponding components have been assigned reference numerals similar to that of the embodiment of FIGS. 1-24, and with the suffix "a" added where a somewhat modified component structure is utilized.

The modification of FIG. 25 illustrates a lighter receptacle having a well part comprising a heat shield 14 and socket member 20, with the rear transverse wall of the socket member being apertured and carrying the stud 42, as in the previous embodiment.

By the invention there is provided a novel and improved modified safety connector cartridge 50a adapted for connection to the rear of the well part, which cartridge 50a is capable of being assembled thereto, and held in a position thereon. In carrying out the invention, a bushing 52a on the cartridge 50a is pressed onto the rearwardly extending threaded stud 42 of the socket member 20 so as to establish electrical connection to the "hot" side of the cigar lighter circuit. The connector cartridge comprises a plastic cup 60, and disposed therein is a metal screw shell 62 as in the previous embodiment. The screw shell 62 makes intimate electric contact with the electrical "ground" side of the well part.

As in the previous embodiment, there is provided on the rear of the well part comprising the socket member 20 and heat shield 14, a cylindrical grounding cup 54 insulatedly mounted by means of a nut 48 on the stud 42. The grounding cup 54 mechanically engages and electrically contacts the transverse end wall 18 of the heat shield 14, and a firm press fit is obtained between the screw shell 62 of the connector cartridge 50a and the grounding cup 54. As shown, the lip of the grounding cup 54 is flared outwardly, to as to telescopically receive the screw shell 62 of the connector cartridge with a press fit.

The screw shell of the connector cartridge has an apertured bottom wall that is fitted into the plastic cup 60. As previously described, during manufacture of the separate safety cartridge, two spade lug parts 72, 74 are molded into the bottom wall of the plastic cup 60, to form a three-piece sub-assembly.

By the present invention a bimetal shunt 90a is carried directly by the stud 42, as opposed to the structure of the previous embodiment where the bimetal shunt 90 was carried by the connector cartridge 50. The mounting portion of the shunt is sandwiched between the washers on the stud 42, as in the prior construction. The bushing 52a is similar in construction to the embodiment of FIG. 2, except that it has a smooth bore, which enables the bushing (and cartridge) to be applied by a simple "push-on" operation, in a direction axially of the stud. The bushing 52a mechanically secures the washers, shell 62 and spade lug parts 72, 74 to the plastic cup 60, and electrically connects the spade lug part 74 to the stud 42. In operation, the bimetal shunt 90a is arranged to "short" the stud 42 to the screw shell 62, located in the cartridge part, in response to overheating occuring in the well part.

As particularly illustrated in FIG. 25 and as noted above, when the separate safety connector cartridge 50a is pushed onto the well part, the edge of the screw shell 62 preferably telescopes into the flare of the grounding cup 54, and a press fit is established therebetween, resulting in good electrical contact along a multiplicity of points between the two engaging surfaces. As a result, the same reliable, high-integrity electrical connection is established between the spade lug part 72, through the screw shell 62 and to the grounding cup 54 at the rear of the well part.

The spade lug parts 72, 74 are arranged to receive a standard push-on electrical receptacle (not shown) so as to retain the advantages of the first embodiment as regards utilization of standard wiring-harness type receptacle configurations.

From the above it can be seen that we have provided novel and improved connector receptacles which are both reliable in use and inexpensive to manufacture and assemble. The various parts can be interfitted in many cases, by the use of automated assembly equipment. The need for extensive manual labor is thus greatly reduced.

In addition, due to the self-centering feature of the screw shell and one spade lug part 72, achieved through the provision of the cooperable, nesting nibs and recesses, there is obtained a high degree of contact integrity, well suited to reliably handle the relatively high currents normally associated with cigar lighters.

The essentially complete encapsulation of the bimetallic shunt by the surrounding connector receptacle cartridge provides a high degree of safety, by isolating and concealing from the exterior of the cigar lighter well, any sparking which might occur as a consequence of the bimetal shunt being actuated from excessive heat. There is thus greatly reduced the possibility of excessive heating of plastic wire insulation, or of a plastic panel, as a consequence of this safety feature as embodied in the present invention.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A cigar lighter receptacle construction, comprising in combination:
   a) a well part, a separate safety connector cartridge part, and means for removably and disconnectably carrying the separate safety connector cartridge part at the rear of the well part,
   b) said parts having electrical connector means constituted as engageable pairs of contactors,
   c) at least one pair of said contactors comprising telescopic metal cup-like formations providing electrical continuity therebetween when the parts are connected, and
   d) bimetallic means carried by the cartridge part, adapted to electrically engage and short-circuit one contactor of a pair of contactors of the connector means in response to overheating of the well part.

2. The invention as defined in claim 1, wherein:
   a) one of said cup-like formations is mounted on and electrically connected with the well part.

3. The invention as defined in claim 2, wherein:
   a) said one cup-like formation has an outwardly flared lip, to telescopically receive the other of said cup-like formations.

4. The invention as defined in claim 1, wherein:
   a) said separate safety connector cartridge part comprises an insulating cup,
   b) one of said cup-like formations being disposed in said insulating cup in nesting relation and forming therewith an annular recess.

5. The invention as defined in claim 4, wherein:
   a) said one cup-like formation comprises a threaded screw shell,
   b) the other cup-like formation being received in said annular recess.

6. The invention as defined in claim 1, wherein:
   a) said well part has a transverse rear wall and an electrical terminal mechanically supported thereby,
   b) said safety connector cartridge part carrying an exterior electrical terminal, and
   c) means electrically connecting said exterior electrical terminal to said bimetallic means, and to said well part electrical terminal.

7. The invention as defined in claim 1, wherein:
   a) said well part has a transverse rear wall, one of said cup-like formations being mounted on and electrically connected with said transverse rear wall,
   b) said safety connector cartridge part carrying an exterior electrical terminal, and
   c) means electrically connecting said exterior electrical terminal to said one cup-like formation.

8. The invention as defined in claim 1, wherein:
   a) said safety connector cartridge part comprises a pair of spade terminals electrically insulated from one another, and
   b) means electrically connecting one spade terminal to one of said pairs of contactors, and for connecting the other spade terminal to the other of said pairs of contactors, respectively.

9. The invention as defined in claim 8, wherein:
   a) said spade terminals are substantially flat, and are disposed substantially perpendicular to one another.

10. The invention as defined in claim 9, wherein:
    a) said safety connector cartridge part comprises a cup with a transverse bottom wall,
    b) said spade terminals extending outwardly from said transverse bottom wall, and being substantially coextensive with one another.

11. The invention as defined in claim 1, wherein:
    a) said connector cartridge part comprises a plastic cup-like electrically insulating housing,
    b) a pair of spade terminals molded into said housing, and forming a three-part assemblage therewith, and
    c) means electrically connecting said spade terminals to said pairs of contactors respectively.

12. The invention as defined in claim 1, wherein:
    a) said connector cartridge part comprises a plastic cup-like electrically insulating housing,
    b) one of said pairs of contactors comprising an electrical contact on the well part and a screw shell disposed in said cup-like insulating housing,
    c) a spade terminal carried by said cup-like insulating housing, and
    d) said spade terminal comprising means for making electrical connection to said screw shell, and thus to said electrical contact on the well part.

13. The invention as defined in claim 1, wherein:
    a) one pair of said contactors comprises cooper able threaded means on the well part and on the connector cartridge part, for advancing the latter toward the well part when it is turned with respect thereto in a screwing-on direction.

14. The invention as defined in claim 1, wherein:
    a) said cartridge part comprises a cup-like metal shell and a cup-like insulating housing therefor,
    b) said bimetallic means comprising a projecting bimetal finger on the cartridge part, adapted to approach and electrically contact the cup-like metal shell of the cartridge part in response to overheating of the well part.

15. The invention as defined in claim 1, wherein:
    a) said cartridge part comprises a cup-like metal shell and a cup-like insulating housing therefor,
    b) said cup-like metal shell constituting part of said one pair of contactors,
    c) said metal shell and housing surrounding said bimetallic means, so as to confine and conceal the same, and thereby isolate, from the exterior of the housing, heat or sparking which occurs within the housing and metal shell during short circuiting of the said one contactor by the bimetallic means.

16. A cigar lighter receptacle construction, comprising in combination:
    a) a well part and a separate safety connector cartridge part adapted to be disconnectably carried at the rear of the well part,
    b) said parts having electrical connector means forming engageable pairs of contactors,
    c) at least one pair of said contactors comprising telescopic cup-like formations,
    d) bimetallic means carried by the cartridge part, adapted to shunt the connector means of the cartridge part in response to overheating of the well part,
    e) said cartridge part comprising an insulated body having a spade lug projecting from one portion thereof,
    f) a bushing mounted in said insulated body and being electrically connected with said spade lug,
    g) said well part having a projecting contact constituting one side of an electrical circuit of said well part, h) said projecting contact being received in said bushing in telescoping relation therewith when the cartridge part is assembled to the well part, so as to establish electrical continuity between the spade lug and the well part's projecting contact.

17. The invention as defined in claim 16, wherein:
a) said projecting contact comprises a threaded metal stud,
b) said bushing having internal threads to mate with the threads of the metal stud, so as to enable the insulated body of the cartridge part and the bushing thereon to be threaded onto the stud and pulled toward the well part.

18. The invention as defined in claim 17, wherein:
a) said bushing and stud provide a mechanical retention of the cartridge part on the well part, and also constitute one pair of said engageable pair of contactors.

19. The invention as defined in claim 17, wherein:
a) said well part and said cartridge part have cooperable detent means responsive to seating of the cartridge part on the well part, to prevent inadvertent turning of the cartridge part in an unscrewing direction.

20. The invention as defined in claim 19, wherein:
a) said cooperable detent means comprises means providing a stop shoulder on said well part and a second stop shoulder on said cartridge part, said shoulders becoming engageable as the cartridge part is seated on the well part.

21. The invention as defined in claim 16, wherein:
a) said projecting contact comprises a threaded metal stud,
b) said bushing having a substantially smooth cylindrical bore adapted to slide over the threaded metal stud to thereby enable the insulated body of the cartridge part to be assembled to the well part by pushing the bushing onto the stud in an axial direction.

22. A cigar lighter receptacle construction, comprising in combination:
a) a well part, a separate safety connector cartridge part, and means for removably and disconnectably carrying the separate safety connector cartridge part at the rear of the well part,
b) said parts having electrical connector means constituted as engageable pairs of contactors,
c) at least one pair of said contactors comprising telescopic metal cup-like formations providing electrical continuity therebetween when the parts are connected, and
d) bimetallic means carried by one of said parts, adapted to electrically engage and short-circuit one contactor of a pair of contactors of the connector means in response to overheating of the well part.

23. The invention as defined in claim 22, wherein:
a) said cartridge part comprises a cup-like metal shell constituting part of said one pair of contactors, and a cup-like insulating housing therefor
b) said bimetallic means comprising a projecting bimetal finger on the well part, adapted to approach and electrically contact the cup-like metal shell of the cartridge part in response to overheating of the well part.

24. A cigar lighter receptacle construction, comprising in combination:
a) a well part, a separate connector cartridge part, and means for removably and disconnectably carrying the separate connector cartridge part at the rear of the well part,
b) said parts having electrical connector means constituted as engageable pairs of contactors,
c) at least one of said pairs of contactors comprising frictionally interengaging telescopic and separable, electrically contacting metal cup-shaped contact formations carried respectively by said well part and said connector cartridge part and providing electrical continuity therebetween when the parts are connected, and interrupting said electrical continuity when the parts are separated.

25. A cigar lighter receptacle construction, comprising in combination:
a) a well part, a separate connector cartridge part, and means for removably and disconnectably carrying the separate connector cartridge part at the rear of the well part,
b) said well part having two electrical terminal portions electrically insulated from one another and connected respectively with two electrical circuits of the well part,
c) said separate connector cartridge part having two projecting electrical terminals, electrically insulated from one another, and extending outwardly from the cartridge part, and
d) means electrically connecting said projecting electrical terminals of the separate connector cartridge part respectively to said two electrical terminal portions of the well part, thereby to enable the cigar lighter receptacle construction to be energized through the projecting electrical terminals of the cartridge part by an electrical connector receptacle connected directly to said projecting electrical terminals thereof,
e) said projecting electrical terminals of the cartridge part comprising two spade lug terminals respectively.

26. The invention as defined in claim 25, wherein:
a) said spade lug terminals have substantially flat portions that are disposed generally perpendicular to one another.

27. A cigar lighter receptacle construction, comprising in combination:
a) a well part, a separate safety connector cartridge part, and means for removably and disconnectably carrying the separate safety connector cartridge part at the rear of the well part,
b) said parts having cooperable electrical connector means constituted as engageable pairs of contactors, one of said pairs being electrically insulated from the other of said pairs,
c) said removable cartridge part comprising a plastic molding having a pair of electrically insulated externally-accessible terminal means molded into it I and said pair of insulated terminal means being connected respectively to the pairs of contactors of the connector means of the cartridge part.

28. The invention as defined in claim 27, wherein:
a) the terminal means comprises projecting spade terminals.

29. The invention as defined in claim 27, and further including:
a) bimetallic shunt means in the cartridge part, adapted to short circuit the cooperable connector means in response to overheating of said shunt means.

30. The invention as defined in claim 27, wherein:
a) said engageable pairs of contactors comprises two pairs, and
b) said terminal means comprises two terminals connected respectively to the two pairs of contactors of the electrical connector means.

* * * * *